United States Patent [19]

Hanley

[11] Patent Number: 4,856,840
[45] Date of Patent: Aug. 15, 1989

[54] METHOD AND APPARATUS FOR EXTENDING THE BED OF A TRUCK

[76] Inventor: Dennis S. Hanley, 3 Frost St., Cambridge, Mass. 02140

[21] Appl. No.: 126,609

[22] Filed: Nov. 30, 1987

[51] Int. Cl.⁴ .............................................. B62D 33/02
[52] U.S. Cl. .................................... 296/26; 296/57.1; 29/401.1
[58] Field of Search ...................... 296/26, 37.6, 57 R; 224/42.42; 29/401.1

[56] References Cited

U.S. PATENT DOCUMENTS

| | | | |
|---|---|---|---|
| 3,132,755 | 5/1964 | Greenslate | 224/42.42 R |
| 4,023,850 | 5/1977 | Tillery | 296/26 |
| 4,531,773 | 7/1985 | Smith | 296/37.6 |
| 4,685,857 | 8/1987 | Goeser et al. | 296/26 |

*Primary Examiner*—Robert R. Song
*Attorney, Agent, or Firm*—Paul G. Lunn, Esq.

[57] ABSTRACT

A truck bed extender comprising a platform which is removably attachable to the rear end of a truck; the platform including a plurality of rods with lips, provided on one side of the platform, the lips engaging the rear end of the truck bed when the rods are inserted between the rear end of the truck bed and the front end of a horizontal positioned open tailgate.

13 Claims, 2 Drawing Sheets

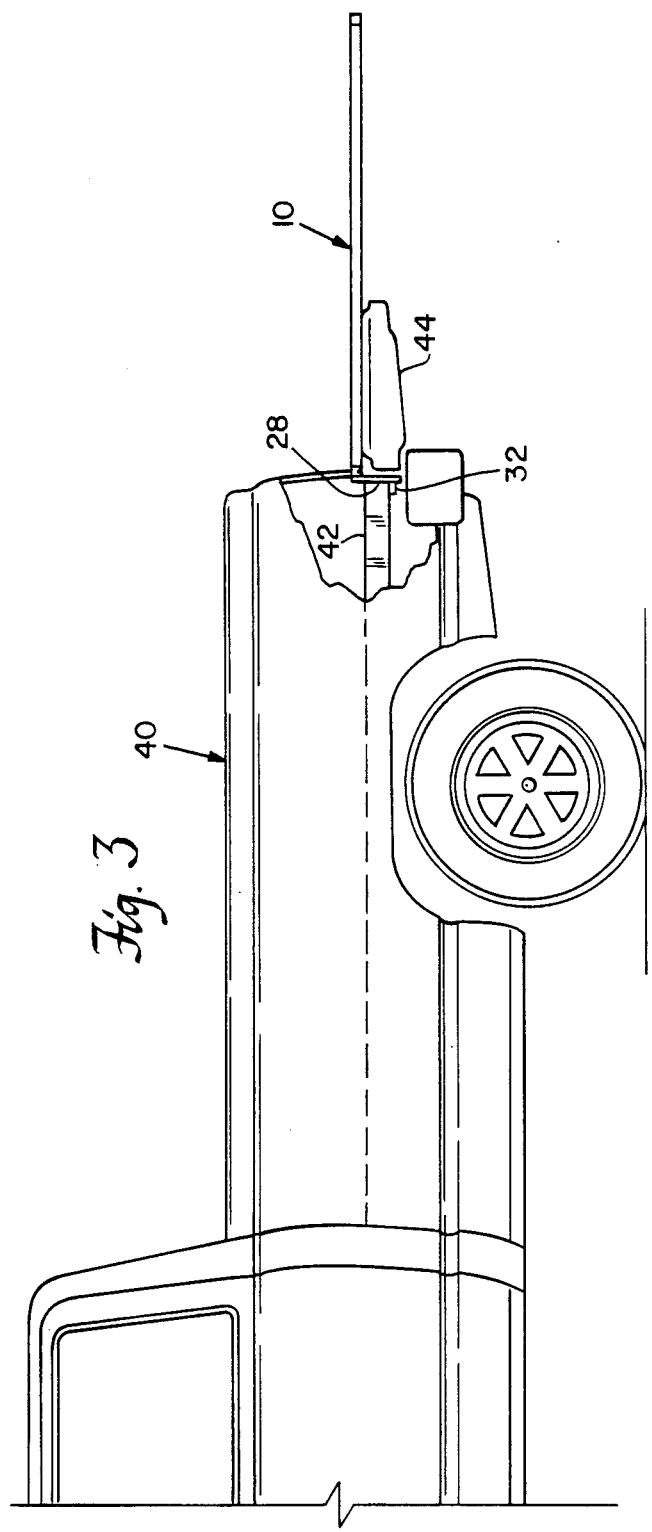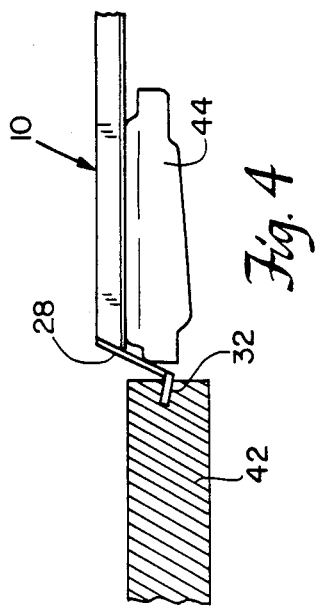

METHOD AND APPARATUS FOR EXTENDING THE BED OF A TRUCK

BACKGROUND OF THE INVENTION

In recent years many truck manufacturing companies have designed and built compact and mid-size trucks. These small and mid-size trucks tend to be very economical to build, maintain and operate. However, they do have a major problem associated with their size. The operator is limited to carrying small loads because of the small size of the rear or bed of the truck.

If one wishes to carry larger loads such as long pieces of lumber one must use a truck having a larger bed or an overhead rack which can be put on top of the bed of the truck. However, an overhead rack is cumbersome and is not easily removable.

SUMMARY OF THE INVENTION

The present invention is a method and apparatus for extending the bed of truck. The method of the present invention is comprised of placing a truck bed extender onto the end of the bed of a truck. The truck end extender of the present invention is comprised of a platform having means for attaching to the end of the truck end. The platform can be any shape as long as it can be attached to the end of the truck so as to support materials which extend out of the bed of the truck.

In a preferred embodiment, the bed extender is a rectangular frame the width of which relatively corresponds to the width of the truck bed. The means for attaching the frame to the end of the truck may be comprised of a plurality of rods, usually two, which are angularly attached to the wall of the frame which abuts to the end of the bed of the truck. At the end of each rod distal from the frame of the bed extender is a peg or a lip which projects from the rod away from the body of the frame. The bed extender is placed on top of the tail-gate of the truck such that the rods are placed in between the bed of the truck and the tail-gate and the peg or lip extending from each rod projects beneath the bed of the truck so as to attach and support the extender to the bed of the truck. Alternatively, holes can be drilled into the bed of the truck such that the peg or lip of each rod can be inserted therein.

BRIEF DESCRIPTION OF THE DRAWINGS

FIG. 3 is a side view of the bed extender shown in FIG. 1 attached to the end of the bed of a pick-up truck.

FIG. 4 is a side view of the preferred embodiment of the bed extender of the present invention.

DETAILED DESCRIPTION OF THE INVENTION

Figure 1:
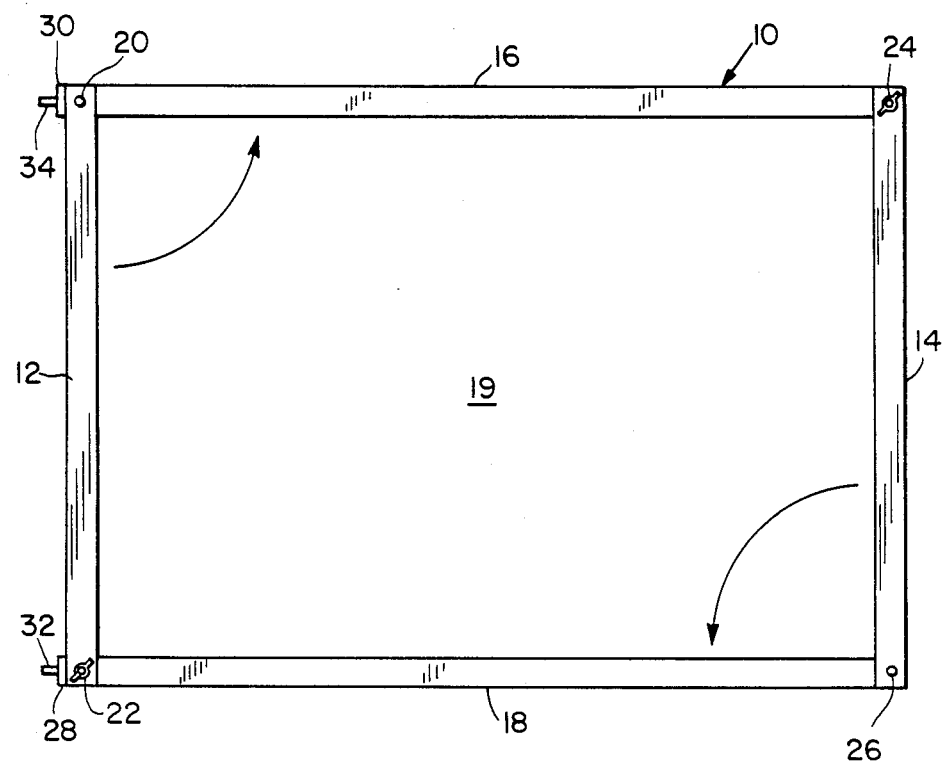
FIG. 1 is a plan view of a bed extender of the present invention.

FIG. 1 depicts an embodiment of a bed extender designated 10 of the present invention. Bed extender 10 is comprised of four side members 12, 14, 16 and 18. Side members 12, 14, 16, and 18 are connected together to form a platform 19. Members 12 and 14 are the sides of platform, 19, which define the width of the platform and members 16 and 18 define the length of the platform. One end of member 12 is connected to one end of member 16 by joining means, 20, which in this case is comprised of a readily disconnectable joining means such as nut and bolt. The other end of member 12 is connected to one end of member 18 by joining means, 22, which in this case is comprised of a readily disconnectable joining means such as a nut and bolt. One end of side member 14 is connected by joining means, 24, to the end of member 16 opposite the end which is connected to side member 12. Joining means 24 is comprised of a readily disconnectable joining means such as a nut and bolt. The other end of side member 14, i.e. the end opposite the end which is connected to member 16, is connected to the end of member 18 opposite the end which is connected to member 12. Member 14 is connected to member 18 by joining means, 26, which is comprised of a readily disconnectable joining means such as a nut and bolt. As a result of joining the side members together by means of nut and bolts the side members can be easily disconnected from each other allowing for quick assembly and disassembly of the truck bed extender. This results in a structure which can be easily folded and stored when not in use. Side members 12, 14, 16 and 18 can be made of any strong structural material such as iron, steel, plastic or wood to name just a few.

Extending angularly down from and attached to side 12 are two vertical rods 28 and 30 respectively. Attached to the ends of rods 28 and 30 distal from the ends which are connected to side 12 are pegs 32 and 34 respectively. This is more clearly seen by viewing FIG. 2 which is a side view of the bed extender shown in FIG. 1.

Figure 2:
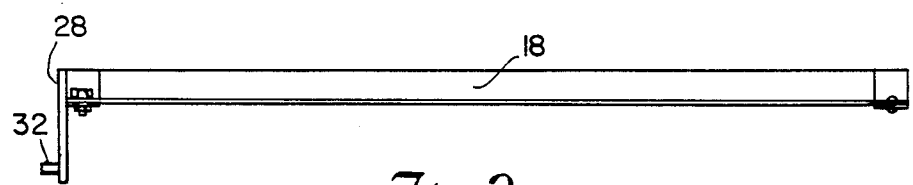
FIG. 2 is a side view of the bed extender shown in FIG. 1.

FIG. 3 shows the bed extender of FIGS. 1 and 2 attached to the end of the bed of a pick-up truck 40. The rear of pick-up truck 40 is comprised of a bed 42 and a tail-gate 44 attached to the rear of the bed 42. To attach bed extender 10 to the rear of pick up truck 40, tail-gate 44 is lowered and rods 28 and 30 are placed in between the end of bed 42 and the inside end of tail-gate 44 such that pegs 32 and 34 extend beneath the bottom of the bed of the truck. Alternatively, holes can be drilled into the rear wall of the bed of the pick-up truck so that pegs 32 and 34 can be inserted therein. Support structure 19 is placed over and is supported by the lowered tail-gate 44.

The bed extender shown in FIG. 4 depicts a preferred embodiment of the present invention. Rods 28 and 30 are attached to side 12 at an angle which may range from 95°–100° and pegs 32 and 34 are inserted into holes in the rear wall of the pick-up truck. These additional modifications enable bed extender 10 to be more securely attached to the bed of the truck.

In FIGS, 1, 2, and 3 support member 19 is rectangular. However, support member 19 can be any geometric shape as long as it serves the purpose of supplying extended support means for the bed of the truck. Also platform 19 can be mere sides connected to one another as is shown in FIGS. 1, 2, and 3, or platform 19 can be a solid platform like a sheet of plywood as long as means are provided to attach and support the platform to the end of the pick-up truck.

While the present invention has been described with respect to certain embodiments, it is not so limited, and it should be understood that variations and modifications thereof may be made which are obvious to those skilled in the art without departing from the spirit or scope of the invention.

I claim:

1. A truck bed extender comprising:

a platform; and means for attaching and supporting the platform to the rear end of a truck, wherein the means for attaching and supporting the platform to the rear end of the truck is comprised of a plurality of rods attached to a side of the platform, the rods extending downwardly in the same direction from the side of the platform, the end of each rod distal from the side of the platform having a lip attached to and projecting from said end, said lip being pointed away from the platform such that the rods can be inserted between the rear end of the truck bed and the front end of the tailgate when the tailgate is in a horizontal open position and said lips are engageable with a rear portion of the truck bed.

2. A truck bed extender as recited in claim 1, wherein the rods extending from the side of the platform extend from said side at about an angle of between about 95°-100°.

3. A truck bed extender as recited in claim 1, wherein the lips extends from the side of the rods are pegs.

4. A truck bed extender as recited in claim 1, wherein the platform is comprised of four side members, two of the side members being width members and defining the width of the platform, and two of the side members being length members and defining the length of the platform, one width member being joined to one end of each of the length members by joining means and the other width member being joined to the opposite end of each of the length members by joining means.

5. A truck bed extender as recited in claim 4 wherein the width members are joined to the length members by disconnectable joining means.

6. A truck bed extender as recited in claim 5 wherein the disconnectable joining means are comprised of nuts and bolts.

7. A truck bed extender comprising:

a platform, said platform being comprised of four side members, two of the side members being width members and defining the width of the platform, and two of the side members being length members and defining the length of the platform, one width member being joined to one end of each of the length members by disconnectable joining means and the other width member being joined to the opposite end of each of the length members by disconnectable joining means; and a plurality of rods attached to a side of the platform at an angle between about 95°-100°, the rods extending downwardly in the same direction from the side of the platform, the end of each rod distal from the side of the platform having a lip attached to and projecting from said end, said lip being pointed away from the platform such that the rods can be inserted between the rear end of the truck bed and the front end of the tailgate when the tailgate is in a horizontal open position and said lips being engageable with a rear portion of the truck bed.

8. A method for extending the bed of a truck comprising:

attaching a truck bed extender to the end of a truck, the truck bed extender comprising: a platform; and means for attaching and supporting the platform to the end of the truck so as to extend the bed of the truck wherein the truck bed extender is comprised of a platform; and a plurality of rods attached to a side of the platform, the rods extending downwardly in the same direction from the side of the platform, the end of each rod distal from the side of the platform having a lip attached to and projecting from said end, said lip being pointed away from the platform such that the rods can be inserted between the rear end of the truck bed and the front end of the tailgate when the tailgate is in a horizontal open position and said lips being engageable with a rear portion of the truck bed.

9. A method as recited in claim 8, wherein the rods extending from the side of the platform extend from said side at about an angle of between about 95°-100°.

10. A method as recited in claim 8, wherein the lips extending from the side of the rods are pegs.

11. A method as recited in claim 8, wherein the platform is comprised of four side members, two of the side members defining the width of the platform, said members being width members and two of the side members defining the length of the platform, said members being length members, one width member being joined to one end of each of the length members by joining means and the other width member being joined to the opposite end of each of the length members by joining means.

12. A method as recited in claim 11, wherein the width members of the platform are joined to the length members by disconnectable joining means.

13. A method as recited in claim 12, wherein the disconnectable joining means are comprised of nuts and bolts.

* * * * *